(12) United States Patent
Suh et al.

(10) Patent No.: US 12,641,532 B2
(45) Date of Patent: May 26, 2026

(54) METHOD AND APPARATUS FOR DETERMINING NETWORK SLICE PRIORITY IN WIRELESS COMMUNICATION SYSTEM

(71) Applicant: Samsung Electronics Co., Ltd., Suwon-si (KR)

(72) Inventors: Dongeun Suh, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 18/311,817

(22) Filed: May 3, 2023

(65) Prior Publication Data

US 2023/0362802 A1 Nov. 9, 2023

(30) Foreign Application Priority Data

May 4, 2022 (KR) ........................ 10-2022-0055209

(51) Int. Cl.
*H04W 48/18* (2009.01)
*H04W 48/08* (2009.01)
*H04W 60/00* (2009.01)

(52) U.S. Cl.
CPC ........... *H04W 48/18* (2013.01); *H04W 48/08* (2013.01); *H04W 60/00* (2013.01)

(58) Field of Classification Search
CPC ..... H04W 48/18; H04W 36/08; H04W 48/16; H04W 60/00; H04W 48/20; H04W 48/08; H04W 36/24
See application file for complete search history.

(56) References Cited

U.S. PATENT DOCUMENTS

| | | | | |
|---|---|---|---|---|
| 2020/0229079 A1* | 7/2020 | Lee | ........................ | H04W 48/02 |
| 2023/0422293 A1* | 12/2023 | Qiao | .................. | H04W 72/566 |
| 2025/0119805 A1* | 4/2025 | Jano | ...................... | H04W 76/27 |

FOREIGN PATENT DOCUMENTS

| | | | | |
|---|---|---|---|---|
| CN | 110380887 B | 4/2021 | | |
| EP | 3955523 A1 | 2/2022 | | |
| WO | WO-2020251435 A1 * | 12/2020 | ........ | H04W 28/0289 |
| WO | WO-2022036081 A1 * | 2/2022 | ............ | H04W 76/10 |

OTHER PUBLICATIONS

International Search Report and Written Opinion of the International Searching Authority dated Aug. 2, 2023, in connection with International Application No. PCT/KR2023/005978, 6 pages.

(Continued)

*Primary Examiner* — Marcus Hammonds

(57) ABSTRACT

The disclosure relates to a 5G or 6G communication system for supporting a higher data transmission rate. The disclosure suggests a method and apparatus for determining a network slice priority in a wireless communication system according to an embodiment. The method comprises: receiving, from a second node, a first message for requesting slice priority related information; obtaining the slice priority related information for a slice priority corresponding to a network slice access stratum group (NSAG); and transmitting, to the second node, a second message including the slice priority related information in response to receiving the first message.

18 Claims, 5 Drawing Sheets

(56) References Cited

OTHER PUBLICATIONS

3GPP TS 23.288 V17.4.0 (Mar. 2022); Technical Specification, 3rd Generation Partnership Project; Technical Specification Group Services and System Aspects; Architecture enhancements for 5G System (5GS) to support network data analytics services (Release 17), Mar. 2022, 205 pages.

Ericsson et al., "Enabling slice priority and slice groups for RRM purposes," S2-2203620 (was S2-2202224), 3GPP SA-WG2 Meeting #150e, E-meeting, Apr. 6-12, 2022, 2 pages.

Nokia et al., "Enabling configuration of Network Slice AS Groups," S2-2203618 (revision of S2-2202706), 3GPP TSG- SA WG2 Meeting #150e, E-meeting, Apr. 6-12, 2022, 8 pages.

China Mobile, "Proposal on slice priority and slice group", S2-2202676, 3GPP SA WG2 Meeting #150-e, Apr. 6-12, 2022; Elbonia, 5 pages.

Supplementary European Search Report dated Jun. 11, 2025, in connection with European Application No. 23799652.5, 12 pages.

CATT, "Discussion on Supporting for NSAG," R3-223515, 3GPP TSG-RAN WG3 #116-e, Online, May 9-19, 2022, 4 pages.

Ericsson, "Discussion and way forward on Slice based Cell re-selection," R2-2205974, 3GPP TSG-RAN WG2 Meeting #118-e, E-meeting, May 9-19, 2022, 6 pages.

* cited by examiner

METHOD AND APPARATUS FOR DETERMINING NETWORK SLICE PRIORITY IN WIRELESS COMMUNICATION SYSTEM

CROSS-REFERENCE TO RELATED APPLICATION

This application is based on and claims priority under 35 U.S.C. § 119 to Korean Patent Application No. 10-2022-0055209, filed on May 4, 2022, in the Korean Intellectual Property Office, the disclosure of which is herein incorporated by reference in its entirety.

BACKGROUND

1. Field

The disclosure relates to a method and apparatus for determining a network slice priority in a wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

In the 3GPP 5G system, a network slice group priority and mapping information between a network slice and a network slice group are provided for slice-based cell reselection of a user equipment (UE). A slice group priority of a current AMF is statically determined by an operator policy.

The disclosure is to solve the above-described problem and to provide a method of a consumer NF for determining a slice group priority based on slice priority-related information.

More specifically, the disclosure suggests a method of an AMF for determining the priority in consideration of a slice load level and slice priority statistics information (e.g., information on a priority determined in the past, frequently used application per UE, location, and time, S-NSSAI, DNN, types of services allowable in a corresponding region, and the like) to more efficiently operate a network.

In accordance with an aspect of the disclosure, a method performed by a first node in a wireless communication system is provided. The method includes receiving, from a second node, a first message for requesting slice priority related information, obtaining the slice priority related information for a slice priority per network slice access stratum group (NSAG), and transmitting, to the second node, a second message in response to the first message, the second message including the slice priority related information.

In accordance with another aspect of the disclosure, a method performed by a second node in a wireless communication system is provided. The method includes transmitting, to a first node, a first message for requesting slice priority related information, and receiving, from the first node, a second message in response to the first message, the second message including the slice priority related information for a slice priority per network slice access stratum group (NSAG), the slice priority related information being obtained by the first node.

In accordance with another aspect of the disclosure, a first node in a wireless communication system is provide. The first node includes a transceiver configured to transmit or receive a signal, and at least one processor, wherein the at least one processor is configured to receive, from a second node, a first message for requesting slice priority related information, obtain the slice priority related information for a slice priority per network slice access stratum group (NSAG); and transmit, to the second node, a second message in response to the first message, the second message including the slice priority related information.

In accordance with another aspect of the disclosure, a second node in a wireless communication system is provide. The second node includes a transceiver configured to transmit or receive a signal, and at least one processor, wherein the at least one processor is configured to transmit, to a first node, a first message for requesting slice priority related information, and receive, from the first node, a second message in response to the first message, the second message including the slice priority related information for a slice priority per network slice access stratum group (NSAG), the slice priority related information being obtained by the first node.

According to an embodiment of the disclosure, a UE may receive a slice group priority determined based on various analysis information and efficiently operate a network.

More specifically, according to an embodiment of the disclosure, when a network slice group priority and mapping information between a network slice and a network slice group are provided for slice-based cell reselection of a user equipment (UE) in the 3GPP 5G system, an AMF may be allowed to determine a slice group priority based on various analysis information for a slice to make a network to be operated more efficiently.

Advantageous effects obtainable from the disclosure may not be limited to the above mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a method of an AMF for determining slice priority information based on slice priority-related analysis information according to an embodiment of the present disclosure;

FIG. 3 illustrates a method of an NSSF for determining slice priority information according to an embodiment of the present disclosure;

DETAILED DESCRIPTION

Figure 1:
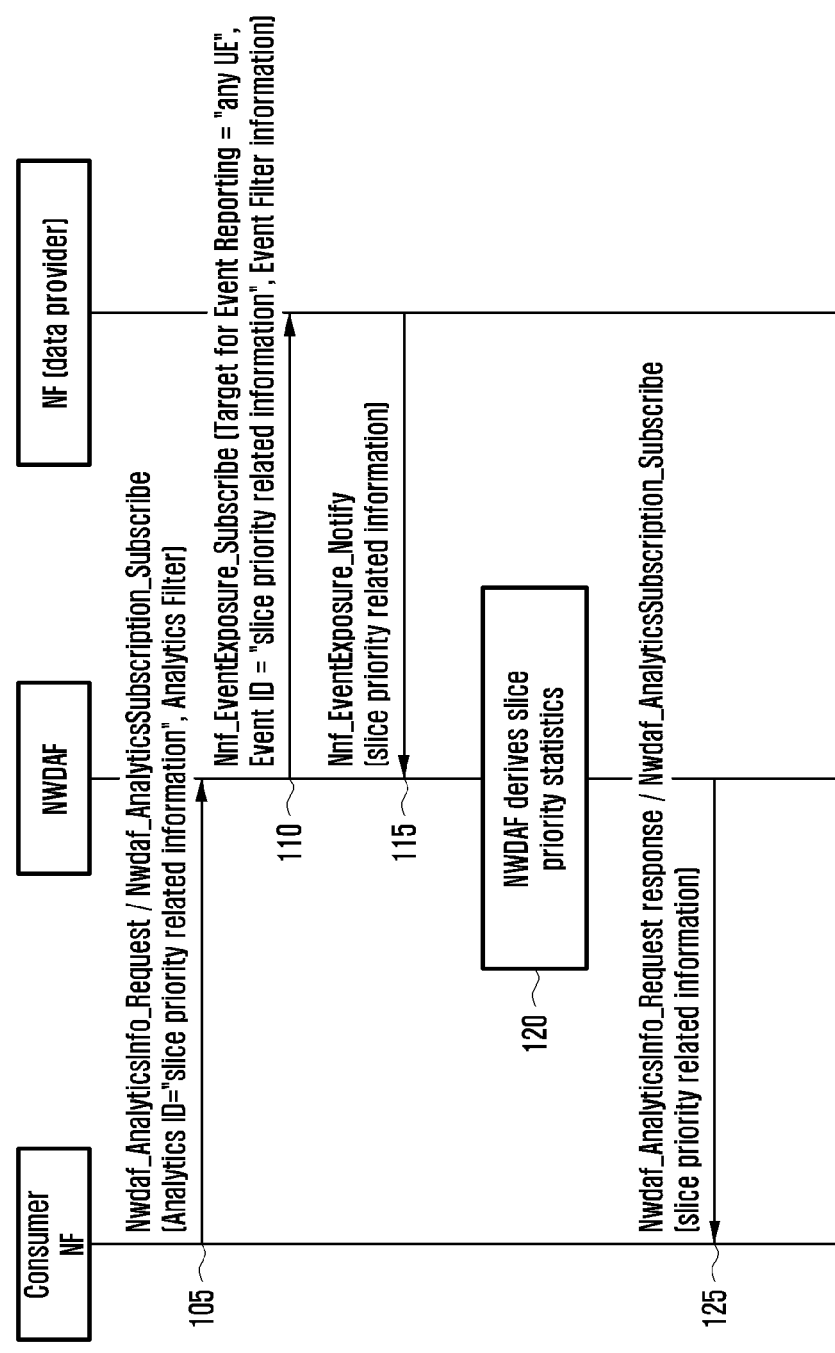
FIG. 1 illustrates a procedure for an NF to subscribe slice priority statistics information analysis information to an NWDAF and receive corresponding information from the NWDAF according to an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

A 5G mobile communication network is constituted of a 5G user equipment (UE) (or terminal), a 5G radio access network (RAN), a base station, a gNB (5g nodeB), eNB (an evolved nodeB and the like), and a 5G core network.

The 5G core network is constituted of network functions such as access and mobility management function (AMF) configured to provide a mobility management function of a UE, a session management function (SMF) configured to provide a session management function, a user plane (UPF) configured to serve to transfer data, a policy control function (PCF) configured to provide a policy control function, a unified data management (UDM) configured to provide a data management function such as subscriber information and policy control data, a unified data repository (UDR) configured to store data of various network functions such as UDM.

A network slicing technology in a 5G system indicates a technology and structure to enable virtualized, independent, multiple logical networks in one physical network. A network service provider provides a service by configuring a virtual end-to-end network called a network slice in order to satisfy a service/application-specific requirement. The network slice is distinguished by an identifier called single-network slice selection assistance information (S-NS SAI).

A network transmits a slice set (e.g., allowed NSSAI(s)) allowed to a UE during a UE registration procedure, and the UE transmits/receives application data through a protocol data unit (PDU) generated through one S-NSSAI (i.e., a network slice) in the slice set.

In the 5G system, a radio access network (RAN) is responsible for one or more tracking areas (TA, a unit defined to track a location of a UE in the 5G system) and a different frequency and network slice may be supported per TA or per cell in a TA. The base station may broadcast network slice information supported per TA to the UE and the UE may identify which network slice is supported per TA based on corresponding information.

Here, the slice information per cell and per TA broadcasted by the RAN may include an identifier (i.e., a slice group id) information of a slice group to which corresponding S-NSSAI is mapped instead of S-NSSAI per slice. The UE may determine which slice groups are supported per TA (i.e., slice groups supported by cells in a TA per TA) and determine which S-NSSAIs are supported per TA based on mapping relationship information between a slice group id and S-NSSAI received from an AMF through a non-access stratum (NAS, a communication protocol between a UE and an AMF).

In a cell reselection process which is a procedure for selecting a suitable cell, the UE may determine a cell based on slice related information broadcasted by the RAN and a priority value per slice group id or S-NSSAI received from NAS. For example, when a network operator wants to move a UE to a cell in which a specific slice is supported, a high priority may be given to the corresponding slice or slice group.

In the 5G RAN, mapping between a slice group id and S-NSSAI is configured in unit of TA. Therefore, different rules may be applied to mapping between a slice group ids and S-NSSAI per TA. For example, in different TAs, the same slice group id may be an identifier representing different S-NSSAI. The UE may receive mapping relationship information between a slice group id and S-NSSAI for some TAs (e.g., TAs belonging to a registration area (RA)) from an AMF through an NAS in a network registration procedure. Here, in case that there are TAs using difference mapping rules with respect to slices to be provided with mapping, the corresponding TA and different mapping relationship information in the corresponding TA may be included together and transmitted. In the case of moving to a TA other than an RA received in the last network registration procedure, the UE may perform a network registration procedure again and receive mapping information between S-NSSAI and a slice group id for new TAs.

A slice group priority of a current AMF is statically determined by an operator policy. It is possible to effectively operate a network when an AMF determines the priority in consideration of a slice load level and slice priority statistics information (e.g., on a priority determined in the past, frequently used application per UE, location, and time, S-NSSAI, DNN, types of services allowable in a corresponding region, and the like).

FIG. 1 illustrates a procedure for a consumer network function (NF) to subscribe slice priority information to a network data analytics function (NWDAF) and receive corresponding information from the NWDAF according to an embodiment of the disclosure.

In operation 105, the consumer network function (NF) may transmit a request message or a subscription request message for slice priority related information per slice or slice group for cell reselection. The message may include information below:

An analytics ID, a target of analytics reporting, an analytics target period, and an analytic filter.

The analytics ID corresponds to information indicating a type of analytical or statistical information to be requested and indicate a value corresponding to slice priority related information.

The target of analytics reporting is information indicating a target of requested analytics information (e.g., analytical information for a specific UE) and may correspond to a UE identifier (identifiers) (a UE ID (IDs)), a UE group ID (IDs) (i.e., an identifier (identifiers) of a group to which one or more UE belong), or "any UE" indicating that the request is for all UEs.

The analytics target period indicates a target period and if present, indicates requesting of slice priority related information for the corresponding time period.

The analytics filter includes parameters transmitted when a consumer NF requests slice priority related information and corresponds to parameters for specifying information desired to be received. For example, when requesting slice priority related information for a specific slice, single-network slice selection assistance information (S-NSSAI) for the corresponding slice may be included in the analytics filter.

The analytics filter may include the following and may include a combination of one or more parameters corresponding to information.

Table 1 shows analytics filter information related to slice priority related information.

TABLE 1

| Information | Description |
|---|---|
| Slice group identifier | The slice group identifier is used when requesting slice priority related information for a network slice group (a group including one or more network slices) identified with the slice group identifier. |
| S-NSSAI | The S-NSSAI is used when requesting slice priority related information for a network slice identified with the S-NSSAI. |
| NSI ID(s) | The network slice instance (NSI) ID(s) is used when requesting slice priority related information for a network slice instance identified with the NSI ID. |

TABLE 1-continued

| Information | Description |
|---|---|
| Area of Interest | The area of interest may include a TA list and is used when requesting slice priority related information for TAs included in the TA list. |
| DNN | When requesting service experience for an application, this is the DNN to access the application. |

In operation 110, the NWDAF receives a message having received from the consumer NF in operation 105 and performs a data collection request to a network function to collect each information when determining that data collection is required to provide information requested in the message. Here, a message to be transmitted to each NF may include information below:

An event ID, a target for event reporting, and an event filter.

The event ID is an identifier indicating a type of data desired to be collected. The NWDAF identifies that the analytics ID in the message received in operation 105 is slice priority related information and configures an event ID for information collection from the corresponding NF to provide the corresponding information.

The target of event reporting is information indicating a target of collection data (e.g., analytical information for a specific UE) and may correspond to a UE identifier (identifiers) (a UE ID (IDs)), a UE group ID (IDs) (i.e., an identifier (identifiers) of a group to which one or more UE belong), or "any UE" indicating that the request is for all UEs. The NWDAF may configure target of event reporting based on information corresponding to the target of analytics reporting received in operation 105.

The event filter indicates information for specifying data collected from the NF by the NWDAF. For example, when collecting data for a specific slice, the S-NSSAI for the corresponding slice may be included in the event filter.

The event filter may include the same types of parameters as information in Table 1.

In operation 115, the NF provides necessary information to the NWDAF based on the message received in operation 110. Here, as shown in Table 2, the NF corresponding to a source per information provides the corresponding information to the NWDAF. Table 2 shows data for slice priority related information.

TABLE 2

| Information | Source | Description |
|---|---|---|
| Information per UE | | Information for one UE. It is possible to include information on multiple UEs. |
| >Timestamp | 5GC NF | Data occurrence time point (i.e., timestamp) |
| >Location | AMF | UE location information, e.g., cell ID or TAI. |
| >UE ID | AMF | An identifier of a UE. For example, SUPI |
| >a list of UE Group ID | AMF, NEF, UDM | An identifier (identifiers) for a group (groups) to which a UE belongs. Multiple groups may exist per service and accordingly, identifiers for multiple groups may exist. |
| >Rejected NSSAI | AMF | Slice information rejecting a UE (list of S-NSSAIs) |
| >Requested NSSAI | AMF | Slice information requested by a UE (list of S-NSSAIs) |
| >Slice priority | AMF or NSSF | Slice priority information determined to a UE. The slice priority may include a priority value indicating a cell reselection priority per S-NSSAI or per slice group identifier. Only most recently determined slice priority information may be provided. |
| >Slice to slice group mapping | AMF or NSSF | Slice to slice group mapping information per TA |
| >a list of DNN and S-NSSAI | SMF | Information on a DNN and a S-NSSAI identifier used by a UE and a use rate thereof per S-NSSAI, per DNN, or per DNN and S-NSSAI |
| >forbidden S-NSSAIs or slice group identifier | or UDM AMF or NSSF | S-NSSAI or slice group identifiers forbidding cell reselection per UE |
| >forbidden area | AMF or NSSF or UDM | UE-specific TAs in which cell reselection is forbidden |
| Non-UE specific information | | Information on a location and a slice (or slice group) rather than information on a specific UE |
| >Timestamp | 5GC NF | Data occurrence time point (i.e., timestamp) |
| >Location | AMF | UE location information, e.g., cell ID or TAI. |

TABLE 2-continued

| Information | Source | Description |
|---|---|---|
| >slice load information | AMF or NSACF | Load information per S-NSSAI or per slice group identifier. An arbitrary slice group identifier may indicate one or more pieces of S-NSSAI. The load information per S-NSSAI or per slice group identifier may include the number of UEs registered to the corresponding S-NSSAI or a slice (slices) corresponding to a slice group identifier, the number of PDU sessions, a data rate in use, and the like. |
| >>Average Slice priority per location | AMF or NSSF | An average value of slice priority information determined to all UEs per location (TA, cell, or geographical location). The slice priority may include a priority value indicating a cell reselection priority per S-NSSAI or per slice group identifier. Only most recently determined slice priority information may be provided. |
| >>Average Slice priority per UE Group ID | AMF or NSSF | An average value of slice priority information determined to the corresponding UEs per UE group ID per location (TA, cell, or geographical location). The slice priority may include a priority value indicating a cell reselection priority per S-NSSAI or per slice group identifier. Only most recently determined slice priority information may be provided. |
| >forbidden S-NSSAIs or slice group identifier | or UDM AMF or NSSF | S-NSSAI or slice group identifiers in which cell reselection is forbidden. |
| >forbidden area | AMF or NSSF or UDM | TAs in which cell reselection is forbidden |

In operation 120, the NWDAF may determine slice priority related information based on information received in operation 115.

In operation 125, the NWDAF may include the slice priority related information in a response message to be transmitted to the consumer NF and transmit the response message. Here, the slice priority related information is configured as shown in Table 3.

The consumer NF may perform UE slice priority determination based on the received slice priority related information.

Table 3 shows slice priority related information.

TABLE 3

| Information | Description |
|---|---|
| Information per UE | Information for one UE. It is possible to include information on multiple UEs. |
| >Timestamp | Data acquisition time point (i.e., timestamp) |
| >Location | UE location information, e.g., cell ID or TAI. |
| >UE ID | An identifier of a UE, e.g., SUPI |
| >a list of UE Group ID | An identifier (identifiers) for a group (groups) to which a UE belongs. Multiple groups may exist per service and accordingly, identifiers for multiple groups may exist. |
| >Rejected NSSAI | Slice information rejecting a UE |
| >Requested NSSAI | Slice information requested by a UE |
| >Slice priority | Slice priority information determined to a UE. The slice priority may include a priority value indicating a cell reselection priority per S-NSSAI or per slice group identifier. Only most recently determined slice priority information may be provided. |
| >Slice to slice group mapping | Slice to slice group mapping information per TA |
| >a list of DNN and S-NSSAI | Information on a DNN and a S-NSSAI identifier used by a UE and a use rate thereof per S-NSSAI, per DNN, or per DNN and S-NSSAI |
| >forbidden S-NSSAIs or slice group identifier | S-NSSAI or slice group identifiers forbidding cell reselection per UE |
| >forbidden area | UE-specific TAs in which cell reselection is forbidden |

TABLE 3-continued

| Information | Description |
|---|---|
| Non-UE specific information | Information on a specific location and a slice (or slice group) rather than information on a specific UE |
| >Timestamp | Data acquisition time point (i.e., timestamp) |
| >Average Slice priority per location | An average value of slice priority information determined to all UEs per location (TA, cell, or geographical location). The slice priority information may include a priority value indicating a cell reselection priority per S-NSSAI or per slice group identifier. Only most recently determined slice priority information may be provided. |
| >>Average Slice priority per UE Group ID | An average value of slice priority information determined to the corresponding UEs per UE group ID per location (TA, cell, or geographical location). The slice priority may include a priority value indicating a cell reselection priority per S-NSSAI or per slice group identifier. Only most recently determined slice priority information may be provided. |
| >forbidden S-NSSAIs or slice group identifier | S-NSSAI or slice group identifiers in which cell reselection is forbidden. |
| >forbidden area | TAs in which cell reselection is forbidden |

Figure 2:
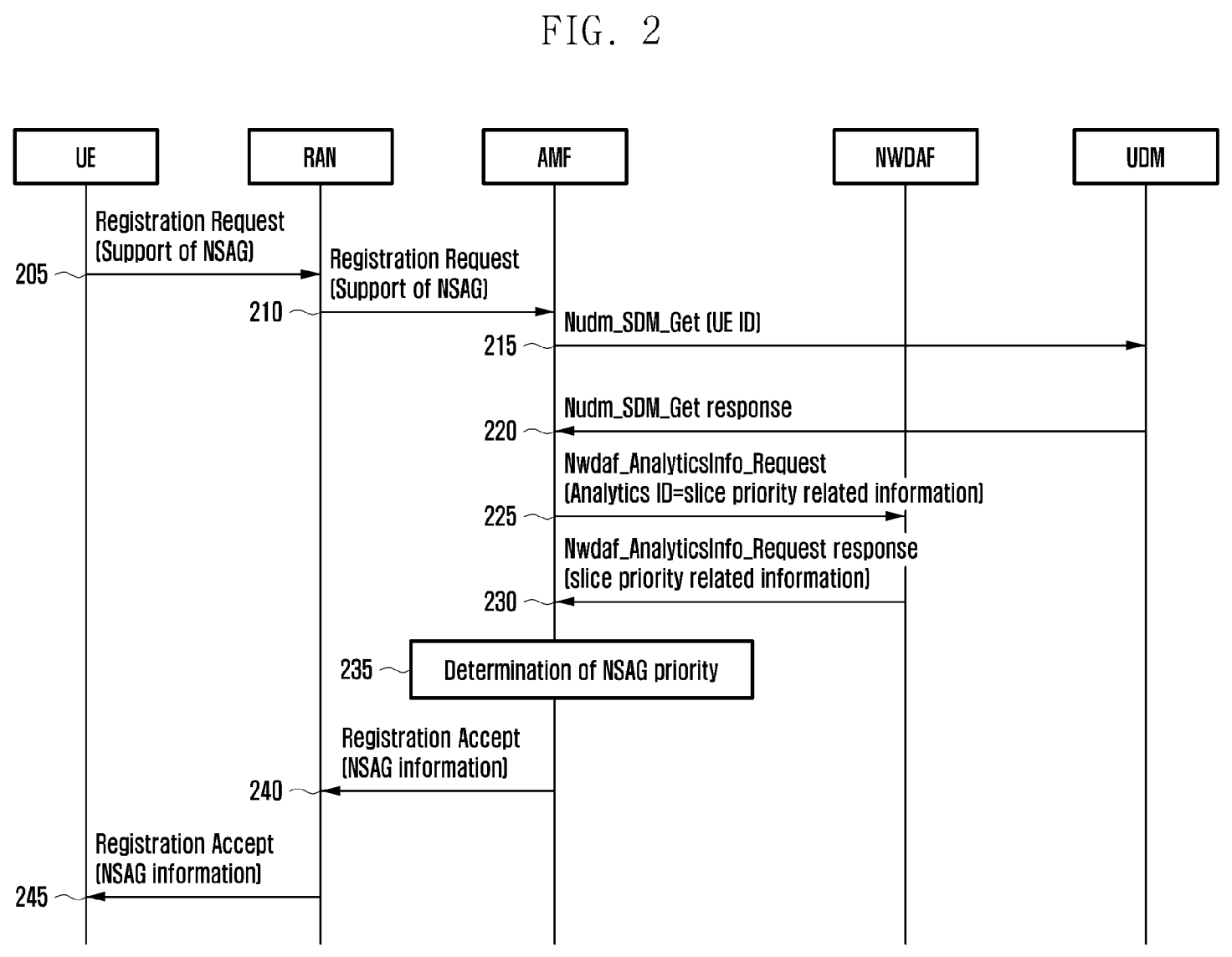

FIG. 2 illustrates a method of an access and mobility management function (AMF) for determining a slice priority based on slice priority-related analysis information according to an embodiment of the present disclosure.

More specifically, FIG. 2 represents determining of a slice priority to be transferred to the UE based on slice priority related information received from a network data analytics function (NWDAF) by an access and mobility management function (AMF) in a UE registration procedure.

In operation 205, the UE may transmit an AN message (AN parameter, registration request) to the base station (RAN).

Here, the registration request message may include at least one of a UE identifier (subscription concealed identifier (SUCI), a 5G-globally unique temporary identity (5G-GUTI), a permanent equipment identifier (PEI), or the like), requested NSSAI, UE mobility management (MM) core network capability, and the like.

In case that the UE supports a network slice priority and network slice group for cell reselection (i.e., in case of supporting a network slice access stratum (AS) group (NSAG)), the UE may include support of NSAG in the UE MM core network capability.

When the UE supporting the NSAG receives mapping relationship information between a slice group id and single-network slice selection assistance information (S-NSSAI) for some TAs (e.g., tracking areas (TAs) belonging to a registration area (RA)) and a priority value per S-NSSAI or a priority value per slice group id, a corresponding UE NAS may transfer corresponding information to a UE AS to perform cell reselection based on a slice group priority.

In operation 210, the base station (RAN) may select an AMF based on information in the AN message received from the UE.

The RAN may transfer an N2 message (N2 parameters, registration request) to the selected AMF. The N2 parameter may include a selected PLMN ID, UE location information, a UE context request, and the like. Here, the N2 message may include a RAN ID.

In operation 215, the AMF may request subscriber information of the UE by including an identifier for requested information and a UE identifier in the message to be transmitted to a unified data management function (UDM).

In operation 220, the UDM may include subscriber information for the requested information and the UE identifier of the message received from the AMF in operation 215 in a response message to be transmitted to the AMF. The corresponding information may include an identifier (identifiers) (UE group ID(s)) for a service group to which the UE belongs.

In case that the message received in operation 210 includes information indicating that the UE supports an NSAG, the AMF may request information required for determining an optimum slice priority from the NWDAF in operation 225. Here, the request message may include information below:

An analytics ID, a target of analytics reporting, an analytics target period, and an analytic filter.

The analytics ID corresponds to information indicating a type of analytical or statistical information to be requested and indicate a value corresponding to slice priority related information.

The target of analytics reporting is information indicating a target of requested analytics information (e.g., analytical information for a specific UE) and may correspond to a UE identifier (identifiers) (a UE ID (IDs)), a UE group ID (IDs) (i.e., an identifier (identifiers) of a group to which one or more UE belong), or "any UE" indicating that the request is for all UEs.

The analytics target period indicates a target period and, if present, indicates requesting of slice priority related information for the corresponding time period.

The analytics filter includes parameters transmitted when the AMF which corresponds to a consumer NF requests slice priority related information and corresponds to parameters for specifying information desired to be received. For example, when requesting slice priority related information for a specific slice, the S-NSSAI for the corresponding slice may be included in the analytics filter. The analytics filter may be configured as the analytics filter information related to the slice priority related information shown in Table 1 and may be configured of a combination of one or more parameters corresponding to the information in the table.

In case that the analytics ID of the message received from the AMF in operation 225 indicates network slice priority related information, in operation 230, the NWDAF provides slice priority related information according to a target of analytics reporting, an analytics target period, and an analytics filter included in the corresponding message.

Here, the slice priority related information to be provided to the AMF may be configured of a combination of information in the slice priority related information shown in Table 3. Furthermore, the slice priority related information may be configured of information in the table matching the target of analytics reporting, the analytics target period, and the analytics filter and provided.

In case that the analytics ID of the message received from the AMF in operation 225 indicates network slice priority related information, the NWDAF may determine data required to be collected from other NFs and request data collection to the corresponding NFs according to the target of analytics reporting, the analytics target period, and the analytics filter included in the corresponding message. Here, as shown in Table 1, data may be collected from the corresponding NF according to a relationship between the collection data and the NF.

The NWDAF includes the configured slice related priority information in a message to be transmitted to the AMF.

In case that a message including slice related priority information (i.e., the information in Table 3) is received from the NWDAF in operation 230 and support of NSAG is included in the registration request message received in operation 210, in operation 235, the AMF determines a slice priority (a priority per S-NSSAI or a priority per slice group id) for cell reselection of the UE having transmitted the registration request received in operation 210 based on slice related priority information (i.e., the information in Table 3).

In operation 240, the AMF may include a registration accept message in the N2 message and transmit the N2 message to the RAN. In case that a slice priority for the UE is determined in operation 235, the AMF may include NSAG information including the determined slice priority and information on a mapping relationship between S-NSSAI and a slice group id in a registration accept message or registration reject message.

In operation 245, the RAN may transmit, to the UE, the registration accept message or the registration reject message in the message received from the AMF in operation 240. In case that NSAG information exists in the received registration accept message or registration reject message, the UE may perform cell reselection or RACH.

Figure 3:
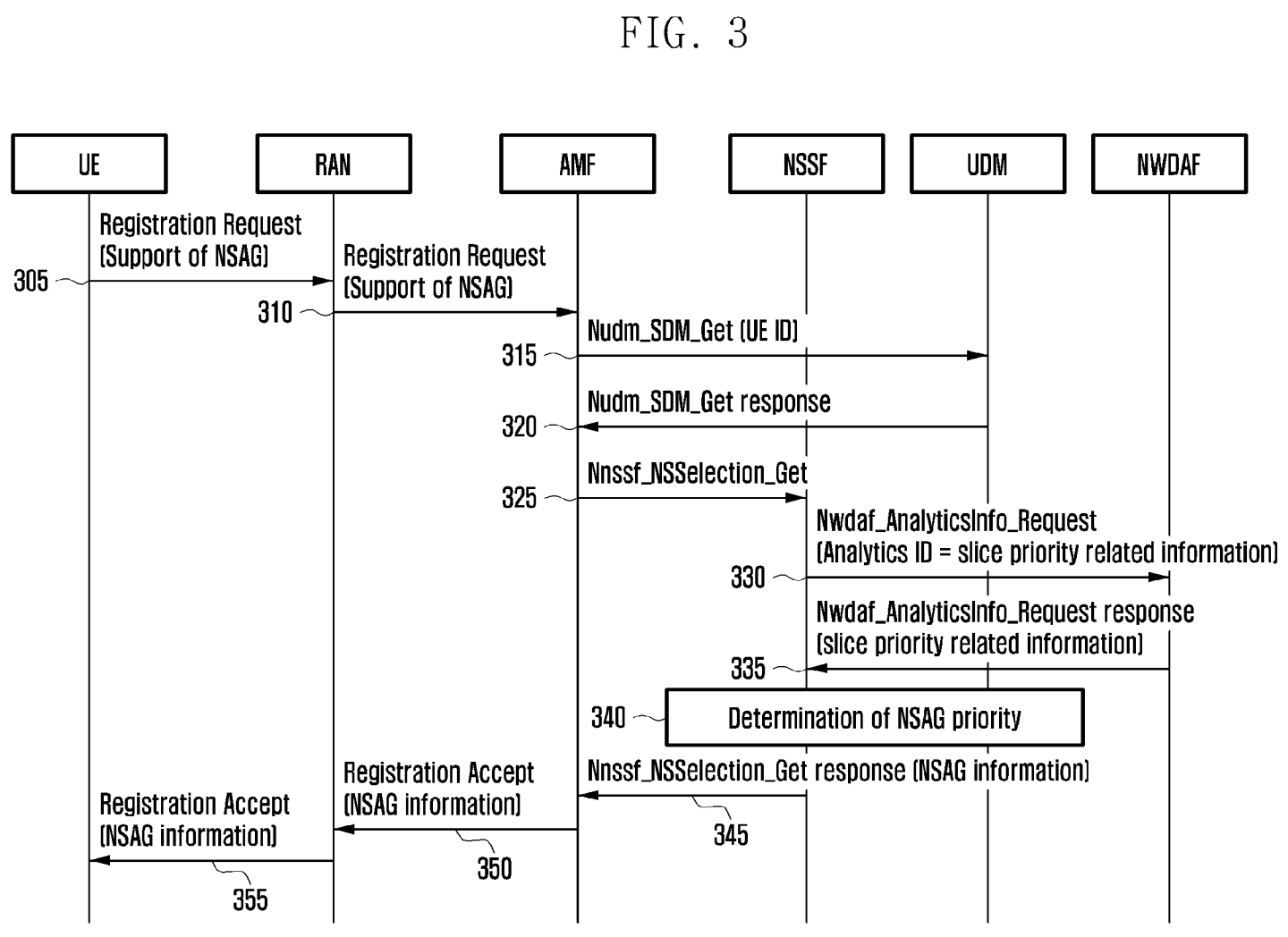

FIG. 3 illustrates a method of a network slice selection function (NSSF) for determining slice priority information according to an embodiment of the present disclosure.

More specifically, FIG. 3 represents that the network slice selection function (NSSF) determines a slice priority based on slice priority related information in a UE registration procedure.

In operation 305, the UE may transmit an AN message (AN parameter, registration request) to the base station (RAN). Here, the registration request message may include at least one of a UE identifier (subscription concealed identifier (SUCI), a 5G-globally unique temporary identity (5G-GUTI), a permanent equipment identifier (PEI), or the like), requested NSSAI, UE mobility management (MM) core network capability, and the like.

In case that the UE supports a network slice priority and network slice group for cell reselection (i.e., in case of supporting a network slice access stratum (AS) group (NSAG)), the UE may include support of NSAG in the UE MM core network capability.

When the UE supporting the NSAG receives mapping relationship information between a slice group id and S-NS-SAI for some TAs (e.g., TAs belonging to a registration area (RA)) and a priority value per S-NSSAI or a priority value per slice group id, the corresponding UE NAS may transfer corresponding information to a UE AS to perform cell reselection based on a slice group priority.

In operation 310, the RAN may select an access and mobility management function (AMF) based on information in the AN message received from the UE.

The RAN may transfer an N2 message (N2 parameters, registration request) to the selected AMF. The N2 parameter may include a selected PLMN ID, UE location information, a UE context request, and the like. Here, the N2 message may include a RAN ID.

In operation 315, the AMF may request subscriber information of the UE by including an identifier for requested information and a UE identifier in the message to be transmitted to a unified data management function (UDM).

In operation 320, the UDM may include subscriber information for the requested information and the UE identifier of the message received from the AMF in operation 315 in a response message to be transmitted to the AMF. The corresponding information may include an identifier (identifiers) (UE group ID(s)) for a service group to which the UE belongs.

In case that information (support of NSAG) indicating that the UE supports NSAG is included in the message received in operation 310 and the AMF has a difficulty in calculating NSAG information in operation 325, the AMG may transmit a message for requesting NSAG information to a network slice selection function (NSSF).

The message may include support of NSAG, a UE ID, a UE group ID (IDs), S-NSSAI, a slice group identifier (identifiers), a UE location (locations).

In case that the AMF requests and receives slice priority related information to and from a network data analytics function (NWDAF), slice priority related information may be included in a message to be transmitted to an NSSF and in this case, a procedure in which the NSSF requests and receives slice priority related information to and from the NWDAF is omitted from following operation 330, operation 335, and operation 340, and the NSSF determines NSAG information by using slice priority related information received from the AMF.

Meanwhile, the AMF may have a difficulty in calculating NSAG information in the following cases:

The NSAG information is calculated with respect to specific TA sets and in this case, if there is a TA which does not know mapping information between S-NSSAI and a slice group id among TAs belonging to the TA sets (for example, the UE is located in a boundary of an AMF service area (SA) so that mapping information between a slice group id and S-NSSAI with respect to TAs outside the SA is required to be obtained)

In case that the message received in operation 325 includes information indicating that the UE supports an NSAG, the NSSF may request information required for determining an optimum slice priority from the NWDAF in operation 330. Here, the request message may include information below:

An analytics ID, a target of analytics reporting, an analytics target period, and an analytic filter.

The analytics ID corresponds to information indicating a type of analytical or statistical information to be requested and indicate a value corresponding to slice priority related information.

The target of analytics reporting is information indicating a target of requested analytics information (e.g., analytical information for a specific UE) and may correspond to a UE identifier (identifiers) (a UE ID (IDs)), a UE group ID (IDs) (i.e., an identifier (identifiers) of a group to which one or more UE belong), or "any UE" indicating that the request is for all UEs.

The analytics target period indicates a target period and if present, indicates requesting of slice priority related information for the corresponding time period.

The analytics filter includes parameters transmitted when the NSSF which corresponds to a consumer NF requests slice priority related information and corresponds to parameters for specifying information desired to be received. For example, when requesting slice priority related information for a specific slice, single-network slice selection assistance information (S-NSSAI) the corresponding slice may be included in the analytics filter.

The analytics filter may be configured as the analytics filter information related to the slice priority related information shown in Table 1 and may be configured of a combination of one or more parameters corresponding to the information in the table.

In case that the analytics ID of the message received from the NS SF in operation 330 indicates network slice priority related information, in operation 335, the NWDAF provides slice priority related information according to a target of analytics reporting, an analytics target period, and an analytics filter included in the corresponding message.

Here, the slice priority related information to be provided to the AMF is shown Table 3. A combination of information in the slice priority related information may be configured. Furthermore, the slice priority related information may be configured of information in the table matching the target of analytics reporting, the analytics target period, and the analytics filter and provided.

In case that the analytics ID of the message received from the NS SF in operation 330 indicates network slice priority related information, the NWDAF may determine data required to be collected from other NFs and request data collection to the corresponding NFs according to the target of analytics reporting, the analytics target period, and the analytics filter included in the corresponding message. Here, as shown in Table 1, data may be collected from the corresponding NF according to a relationship between the collection data and the NF.

The NWDAF includes the configured slice related priority information in a message to be transmitted to the NSSF.

In case that a message including slice related priority information (i.e., the information in Table 3) is received from the NWDAF in operation 335 and support of NSAG is included in the message received in operation 325, in operation 340, the NSSF determines a slice priority (a priority per S-NSSAI or a priority per slice group id) for cell reselection of the UE based on slice related priority information (i.e., the information in Table 3).

In case that a slice priority for the UE is determined in operation 340, the NSSF may include NSAG information including the determined slice priority and information on a mapping relationship between S-NSSAI and a slice group id in a response message to the message transmitted by the AMF in operation 325 and transmit the response message to the AMF in operation 345.

In case that NSAG information is included in the message from the NSSF in operation 345, the AMF may include the NSAG information in a registration accept message or a registration reject message in operation 350. The AMF may include the registration accept message or the registration reject message in an N2 message to be transmitted to the RAN and transmit the N2 message to the RAN.

In operation 355, the RAN may transmit, to the UE, the registration accept message or the registration reject message in the message received from the AMF in operation 350. In case that NSAG information exists in the received registration accept message or registration reject message, the UE may perform cell reselection or RACH.

Figure 4:
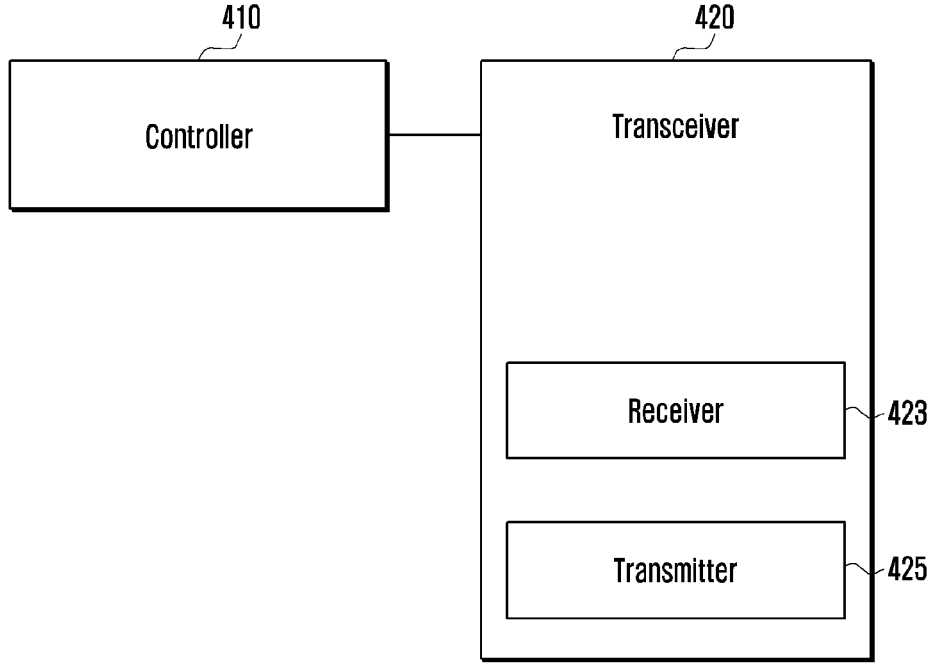
FIG. 4 illustrates a configuration of a UE according to an embodiment of the present disclosure.

FIG. 4 illustrates a configuration of a UE according to an embodiment of the present disclosure.

Referring to FIG. 4, the UE according to an embodiment of the disclosure may include a transceiver 420 and a controller 410 configured to control overall operations of the UE. The transceiver 420 may include a transmitter 425 and a receiver 423.

The transceiver 420 may transmit/receive a signal to/from other network entities.

The controller 410 may control the UE to perform at least one operation among the above-described embodiments. The controller 410 and the transceiver 420 do not necessarily have to be implemented in separate modules and may implemented as a single unit such as a single chip. The controller 410 and the transceiver 420 may be electrically connected to each other. The controller 410 may be, for example, a circuit, an application-specific circuit, or at least one processor. In addition, operations of the UE may be realized by including a memory device storing the corresponding program code in a predetermined component of the UE.

Figure 5:
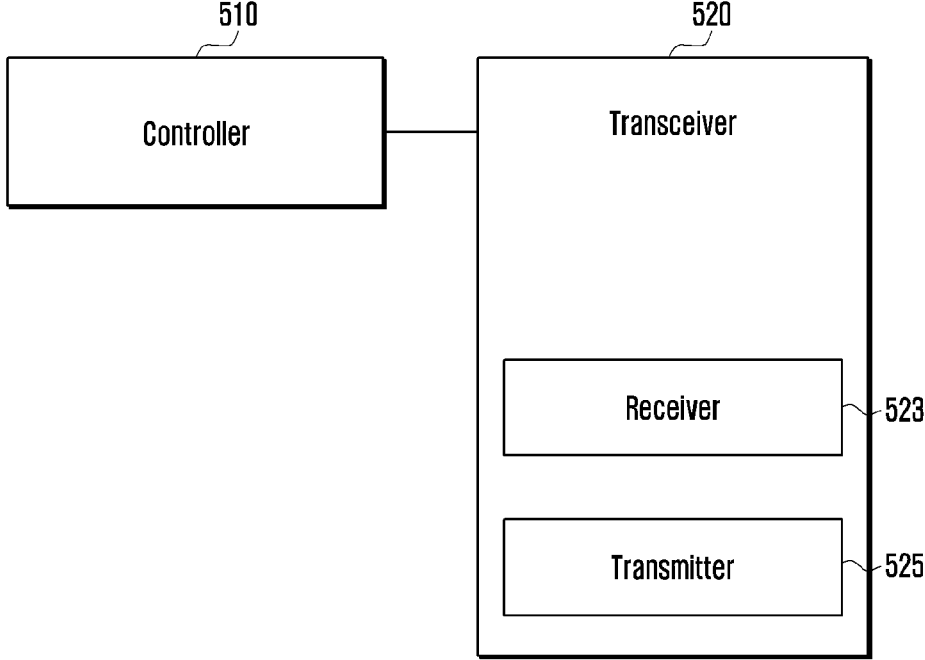
FIG. 5 illustrates a configuration of a network entity according to an embodiment of the present disclosure.

FIG. 5 illustrates a configuration of a network entity according to an embodiment of the present disclosure.

Referring to FIG. 5, the network entity according to an embodiment of the disclosure may include a transceiver 520 and a controller 510 configured to control overall operations of the network entity. The transceiver 520 may include a transmitter 525 and a receiver 523.

The transceiver 520 may transmit/receive a signal to/from another network entity.

The controller 510 may control the network entity to perform at least one operation among the above-described embodiments. The controller 510 and the transceiver 520 do not necessarily have to be implemented in separate modules and may implemented as a single unit such as a single chip. The controller 510 and the transceiver 520 may be electrically connected to each other. The controller 510 may be, for example, a circuit, an application-specific circuit, or at least one processor. In addition, operations of the network entity may be realized by adding a memory device storing the corresponding program code to a predetermined component of the network entity.

The network entity may indicate one of a base station, a session management function (SMF), a user plane function (UPF), a policy control function (PCF), an application function (AF), a network exposure function (NEF), unified data management (UDM), a user data repository (UDR), a network function (NF), an authentication server function (AUSF), and the like.

It should be noted that the configuration diagrams, the exemplary views of the control/data signal transmission method, and the exemplary view of the operation procedure illustrated in FIG. 1 to FIG. 5 are not intended to limit the scope of the disclosure. That is, it should not be construed that all constituent units, entities, or operation steps shown in FIG. 1 to FIG. 5 are essential elements for implementing the disclosure, and it should be understood that the disclosure may be implements by only some elements without departing from the basic scope of the disclosure.

The above-described operations of a base station or a terminal may be implemented by providing a memory device storing corresponding program codes in a bast station or terminal device. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

The embodiments of the disclosure described and shown in the specification and the drawings are merely specific examples that have been presented to easily explain the technical contents of the disclosure and help understanding of the disclosure, and are not intended to limit the scope of the disclosure. It will be apparent to those skilled in the art that, in addition to the embodiments set forth herein, other variants based on the technical idea of the disclosure may be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a network data analytics function (NWDAF) entity in a wireless communication system, the method comprising:

receiving, from an access and mobility management function (AMF) entity, a first message for requesting slice priority related information;

identifying the slice priority related information for a slice priority corresponding to a network slice access stratum group (NSAG);

identifying NSAG information including the slice priority, wherein the NSAG information corresponding to the NSAG is calculated based on a set of timing advances (TAs) associated with a mapping between a slice group identifier (ID) and single network slice selection assistance information (S-NSSAI); and transmitting, to the AMF entity, a second message including the slice priority related information in response to receiving the first message.

2. The method of claim 1, wherein the first message includes at least one of a user equipment (UE) ID, a UE group ID, the slice group ID, the S-NSSAI, or a network slice instance (NSI) ID, and wherein the slice priority related information includes at least one of the UE ID, a list of group ID including the UE, a cell reselection priority per S-NSSAI, a cell reselection priority per NSAG, average slice priority per location, or average slice priority per UE group ID.

3. The method of claim 1, further comprising:

transmitting, to a third node, a third message for requesting data for the slice priority related information based on the first message; and receiving, from the third node, a fourth message including the data for the slice priority related information based on the third message.

4. The method of claim 3, wherein the third message includes at least one of a UE ID, a UE group ID, a slice group ID, the S-NSSAI, or NSI ID, and wherein the data includes at least one of a UE ID, a list of group ID including the UE, slice priority including cell reselection priority per S-NSSAI, cell reselection priority per NSAG, mapping information between S-NSSAI and NSAG, a list of data network name (DNN) and S-NSSAI for the UE, slice load information, average slice priority per location, or average slice priority per UE group ID.

5. A method performed by an access and mobility management function (AMF) entity in a wireless communication system, the method comprising:

receiving, from a user equipment (UE), a registration request message;

transmitting, to a network data analytics function (NWDAF) entity, an analytics information request message for requesting slice priority related information;

as a response to the analytics information request message, receiving, from the NWDAF entity, an analytics information response message including the slice priority related information for a slice priority corresponding to a network slice access stratum group (NSAG);

based on the slice priority related information, determining a slice priority corresponding to the NSAG for the user equipment (UE); and as a response to the registration request message, transmitting, to the UE, a registration response message including NSAG information, wherein the NSAG information includes the slice priority corresponding to the NSAG for the UE and a mapping relationship between an NSAG ID and single network slice selection assistance information (S-NSSAI), and wherein the slice priority corresponding to the NSAG for the UE is for performing a cell reselection.

6. The method of claim 5, wherein the NSAG information is calculated based on a set of timing advances (TAs) associated with a mapping between an NSAG ID and the S-NSSAI.

7. The method of claim 5, wherein the analytics information request message includes an analytics ID, a target of analytics reporting, an analytics target period, analytics filter information, and wherein the slice priority related information includes at least one of a UE ID, a list of group IDs including the UE, a slice priority per NSAG, an average slice priority per location, or an average slice priority per UE group ID.

8. The method of claim 5, wherein the slice priority related information is obtained based on data for the slice priority related information, and wherein the data includes a UE ID, a list of group IDs including the UE, a slice priority per NSAG, an average slice priority per location, or an average slice priority per UE group ID.

9. The method of claim 5, wherein the registration request message includes UE capability information for supporting the NSAG.

10. A network data analytics function (NWDAF) entity in a wireless communication system, the NWDAF entity comprising:

a transceiver; and a controller coupled with the transceiver, and configured to:

receive, from an access and mobility management function (AMF) entity, a first message for requesting slice priority related information, identify the slice priority related information for a slice priority corresponding to a network slice access stratum group (NSAG), identify NSAG information including the slice priority, the NSAG information corresponding to the NSAG is calculated based on a set of timing advances (TAs) associated with a mapping between a slice group identifier (ID) and single network slice selection assistance information (S-NSSAI), and transmit, to the AMF entity, a second message including the slice priority related information in response to receiving the first message.

11. The NWDAF entity of claim 10, wherein the first message includes at least one of a user equipment (UE) ID, a UE group ID, the slice group ID, the S-NSSAI, or a network slice instance (NSI) ID, and wherein the slice priority related information includes at least one of the UE ID, a list of group ID including the UE, a cell reselection priority per S-NSSAI, a cell reselection priority per NSAG, average slice priority per location, or average slice priority per UE group ID.

12. The NWDAF entity of claim 10, wherein the controller is further configured to:

transmit, to a third node, a third message for requesting data for the slice priority related information based on the first message; and receive, from the third node, a fourth message including the data for the slice priority related information based on the third message.

13. The NWDAF entity of claim 12, wherein the third message includes at least one of a UE ID, a UE group ID, a slice group ID, a S-NSSAI, or NSI ID, and wherein the data includes at least one of a UE ID, a list of group ID including the UE, slice priority including cell reselection priority per S-NSSAI, cell reselection priority per NSAG, mapping information between S-NSSAI and NSAG, a list of data network name (DNN) and S-NSSAI for the UE, slice load information, average slice priority per location, or average slice priority per UE group ID.

14. An access and mobility management function (AMF) entity in a wireless communication system, the AMF entity comprising:

a transceiver, and a controller coupled with the transceiver, and configured to:

receive, from a user equipment (UE), a registration request message, transmit, to a network data analytics function (NWDAF) entity, an analytics information request message for requesting slice priority related information, as a response to the analytics information request message, receive, from the NWDAF entity, an analytics information response message including the slice priority related information for a slice priority corresponding to a network slice access stratum group (NSAG), based on the slice priority related information, determine a slice priority corresponding to the NSAG for the user equipment (UE), and as a response to the registration request message, transmit, to the UE, a registration response message including NSAG information, wherein the NSAG information includes the slice priority corresponding to the NSAG for the UE and a mapping relationship between an NSAG ID and single network slice selection assistance information (S-NSSAI), and wherein the slice priority corresponding to the NSAG for the UE is for performing a cell reselection.

15. The AMF entity of claim 14, wherein the NSAG information is calculated based on a set of timing advances (TAs) associated with a mapping between an NSAG ID and the S-NSSAI.

16. The AMF entity of claim 14, wherein the analytics information request message includes an analytics ID, a target of analytics reporting, an analytics target period, analytics filter information, and wherein the slice priority related information includes at least one of a UE ID, a list of group IDs including the UE, a slice priority per NSAG, an average slice priority per location, or an average slice priority per UE group ID.

17. The AMF entity of claim 14, wherein the slice priority related information is obtained based on data for the slice priority related information, and wherein the data includes a UE ID, a list of group IDs including the UE, a slice priority per NSAG, an average slice priority per location, or an average slice priority per UE group ID.

18. The AMF entity of claim 14, wherein the registration request message includes UE capability information for supporting the NSAG.

* * * * *